United States Patent [19]
Jones et al.

[11] 3,951,902
[45] Apr. 20, 1976

[54] POLYIMIDE SEALANT COMPOSITION

[75] Inventors: Robert J. Jones, Hermosa Beach; Howard N. Cassey, Long Beach; Howard E. Green, Los Angeles, all of Calif.

[73] Assignee: TRW Inc., Redondo Beach, Calif.

[22] Filed: Nov. 18, 1974

[21] Appl. No.: 524,607

[52] U.S. Cl................. 260/37 N; 260/47 UA; 260/47 CP; 260/49; 260/63 N; 260/65; 260/77.5 R; 260/78 UA; 260/78 TF; 260/857 PA; 428/474
[51] Int. Cl.²............... C08G 18/62; C08G 73/10
[58] Field of Search........ 260/47 CP, 37 N, 47 UA, 260/49, 63 N, 65, 78 UA, 78 TF, 77.5 R, 857

[56] References Cited
UNITED STATES PATENTS

| | | | |
|---|---|---|---|
| 3,772,254 | 11/1973 | Jones et al. | 260/78 TF |
| 3,812,082 | 5/1974 | Jones | 260/49 |
| 3,868,348 | 2/1975 | Berlin et al. | 260/47 CP |

*Primary Examiner*—Lester L. Lee
*Attorney, Agent, or Firm*—Daniel T. Anderson; Alan D. Akers; Willie Krawitz

[57] ABSTRACT

A compliant polyimide having superior thermal-mechanical properties can be produced by reacting an aromatic bis(furfurylimide) with an aliphatic ether bis(maleimide) via a Diels-Alder reaction. These polyimides display a long-term thermal-oxidative stability and a high percent recoverable elongation to break, and they are suitable for use as films, fibers, coatings, adhesives, structures, and sealants.

7 Claims, No Drawings

POLYIMIDE SEALANT COMPOSITION

The invention herein described was made in the course of or under a contract or subcontract thereunder with the Department of Defense.

BACKGROUND OF THE INVENTION

U.S. Pat. No. 3,812,082 teaches a compliant polyimide having high thermal-oxidative stability in addition to recoverable elongation. The primary disadvantage of the compliant polyimide taught in the patent is that the prepolymer must be dissolved in a solvent prior to application to the intended surface. Thus, in order to leave the polyimide in a workable state during the application, a solvent must be added which will reduce the amount of solid resin being applied. Therefore, when a polyamide-acid precursor is applied to the intended surface, the precursor must be exposed to heat for a predetermined period of time in order to remove the solvent from the precursor. After the solvent is removed, the precursor is then heated to the temperature of imidization. Because the solvent makes up a large percentage of the precursor composition, additional considerations are required if a certain weight of resin solids is desired in the final product, viz., a second application may be required or a larger initial application may be required. In any case, the solvent removal frequently leads to voided structures and precludes use of the polyimide resin.

SUMMARY OF THE INVENTION

The present invention proposes a polyimide having high thermal-oxidative stability and recoverable elongation which may be applied to a surface as 100 percent resin solids. Briefly, the polyimides according to this invention are prepared by reacting a bis(furfurylimide) with a bis(maleimide) via a Diels-Alder reaction. A bis(furfurylimide) is prepared by reacting two moles of maleic anhydride with one mole of a diisocyanate or a diamine terminated aliphatic ether. The bis(furfurylimide) reacts with the bis(maleimide) to form an alicyclic endooxy linkage between the aliphatic ether and the aromatic radical contributed by the dianhydride. This endooxy link chain is characterized by a high degree of workability in the absence of the usual solvent vehicle, and it is cured to a compliant polyimide by the application of heat, which drives off water of aromatization from the endooxy structure. A cross-linked polyimide can be effected by partially substituting a tetraamine or a tetraisocyanate terminated aliphatic ether and by heat treatment of the aromatized polymer.

DESCRIPTION OF THE PREFERRED EMBODIMENTS

Polyaliphatic ethers suitable for use in the present invention may be terminated with either functional amine or functional isocyanate groups. The aliphatic groups in these ether compounds may be either alkylene, alkylidene, haloalkylene, or oxyalkylene having one to six carbon atoms between the oxygen atoms. Substituent groups on the carbon atoms may comprise halogens or oxygen atoms. Molecular weights of these compounds can range from 400 to 10,000, with 500 to 5,000 molecular weight being preferred for most applications. The proportion of the polyaliphatic ether may range from about 2 percent to about 98 percent by weight of the polyimide product depending on the molecular weight of the ether and the desired properties of the polyimide product. Expressed in mole ratios, the functionally terminated polyaliphatic ether may range from approximately 0.02 to 1 for each mole of aromatic compound in the polymer chain, preferably the ratio can range from 0.3 to 0.05 for each mole of the aromatic compound. Ether groups in these compounds provide a polar group which promotes adhesion and repels hydrocarbons and is compatible with most structural metals. The structure of these polyaliphatic ethers may be represented by the following:

$$Z(OA)_yZ$$

wherein Z is a radical selected from the group consisting of $-N=C=O$ and $-NH_2$; A is an aliphatic radical consisting of alkylene, alkylidene, haloalkylene, or oxyalkylene groups having one to six carbon atoms; and y is an integer from 4 to 50 so that molecular weights of 400 or greater are represented by the formula. Illustrations of the polyaliphatic ether diamines are polyoxoethylene diamines, polyoxobutylene diamines, polyoxoisopropylene diamines, polyoxoamylene diamines, polyoxohexamethylene diamines, and polyoxystyrene diamines.

Other aliphatic ethers of special interest comprise perfluoroaliphatic diisocyano ethers. These aliphatic ethers are represented by the following structure:

$$O=C=N(CF_2CF_2O)_m(CF_2)_nO(CF_2CF_2O)_bCF_2CF_2N=C=O$$

where $m+n$ must total an integer of 9 or greater. Polyimides made from these compounds exhibit thermal-oxidative stability at a substantially higher temperature range than the non-halogenated polyaliphatic ethers.

Of special note are the "Jeffamine ED" series diamines. "Jeffamine ED" poly(oxyethylene) diamines are aliphatic primary diamines structurally derived from propylene oxide-capped polyethylene glycol available from the Jefferson Chemical Company, Inc. Structures of "Jeffamine ED" can be generically illustrated as follows:

$$H_2NCHCH_2-(OCHCH_2)_a-(OCH_2CH_2)_b-(OCH_2CH)_c-NH_2$$
$$\quad\;\, CH_3 \qquad\quad CH_3 \qquad\qquad\qquad\qquad\quad CH_3$$

were $a+c$ equals 3.5, while $b$ equals 13.5, 20.5, and 45.5 for molecular weights of 600, 900, and 2,000.

Preparation of the aliphatic ether bis(maleimide) is effected by reacting one equivalent weight of a diisocyanate or diamine terminated aliphatic ether with one molecular weight of maleic anhydride. These reactants are mixed with a small amount of solvent to facilitate the mixing process which is subsequently driven off once the bis(maleimide) is formed. Heating of the mixture in a range of from 20° to 60°C for 3 to 6 hours provides complete reaction of the diamine and the anhydride.

Aromatic dianhydrides which are used to produce the aromatic bis(furfurylimide) may be selected from any of the common tetraacid or dianhydride compounds which are commercially available. The aromatic tetracarboxylic compounds suitable for use in this invention may be illustrated by the following structure:

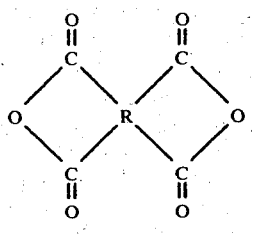

where R is a tetrafunctional radical having the following structure:

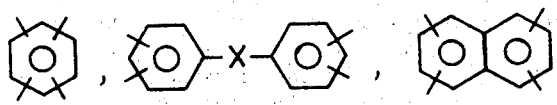

wherein X may be selected from the group consisting of —O—, —S—, —SO$_2$—, —CO—, —CH$_2$—, —C$_2$H$_4$—, —C$_3$H$_6$—, and

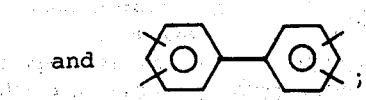

and 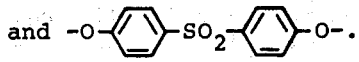;

Illustrations of specific aromatic tetracarboxylic compounds suitable for use in this invention include pyromellitic dianhydride, bis(3,4-dicarboxyphenoxyphenyl)sulfone dianhydride, bis(3,4-dicarboxylic acid phenoxyphenyl)sulfone, bis(3,4-dicarboxyphenyl)sulfone dianhydride, bis(3,4-dicarboxyphenyl)ether dianhydride, diphenyl tetracarboxylic dianhydride, naphthalene tetracarboxylic dianhydride, 2,2-bis(3,4-dicarboxyphenyl)propane dianhydride, benzene-1,2,3,4-tetracarboxylic dianhydride, bis(dicarboxyphenyl)ethane dianhydride, benzophenone tetracarboxylic dianhydride, and bis(dicarboxyphenyl)methane dianhydride. Because of the unusual stability and solubility characteristics, bis(3,4-dicarboxyphenoxyphenyl)sulfone dianhydride disclosed in U.S. Pat. No. 3,812,159 is preferred. Generally, the mole ratio of the aromatic tetracarboxy compound to the aliphatic ether is approximately 1 to 1, although slightly higher mole ratios may be employed to compensate for the inevitable crosslinking of the bis(maleimide).

Aromatic bis(furfurylimides) are produced by the reactions of one molecular weight of an aromatic dianhydride with two molecular weights of furfuryl amine. The reaction between furfuryl amine and bis(3,4-dicarboxyphenoxyphenyl)sulfone dianhydride may be illustrated as follows:

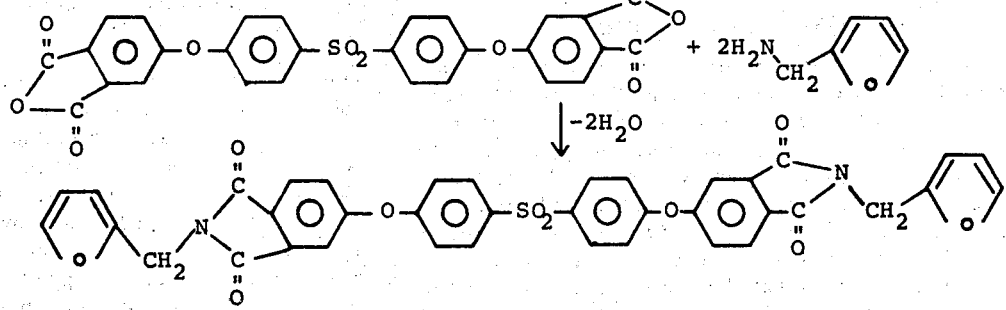

Polyimides according to this invention are made by reacting one equivalent weight of the aromatic bis(furfurylimide) with one equivalent weight of the aliphatic ether bis(maleimide). The bis(furfurylimide) reacts with the bis(maleimide) by a Diels-Alder reaction in the absence of a solvent vehicle. The reaction product is a polymer characterized as a rubbery solid. The poly(Diels-Alder) reaction of bis(3,4-dicarboxyphenoxyphenyl)sulfone furfurylimide with a "Jeffamine" bis(maleimide) may be illustrated as follows:

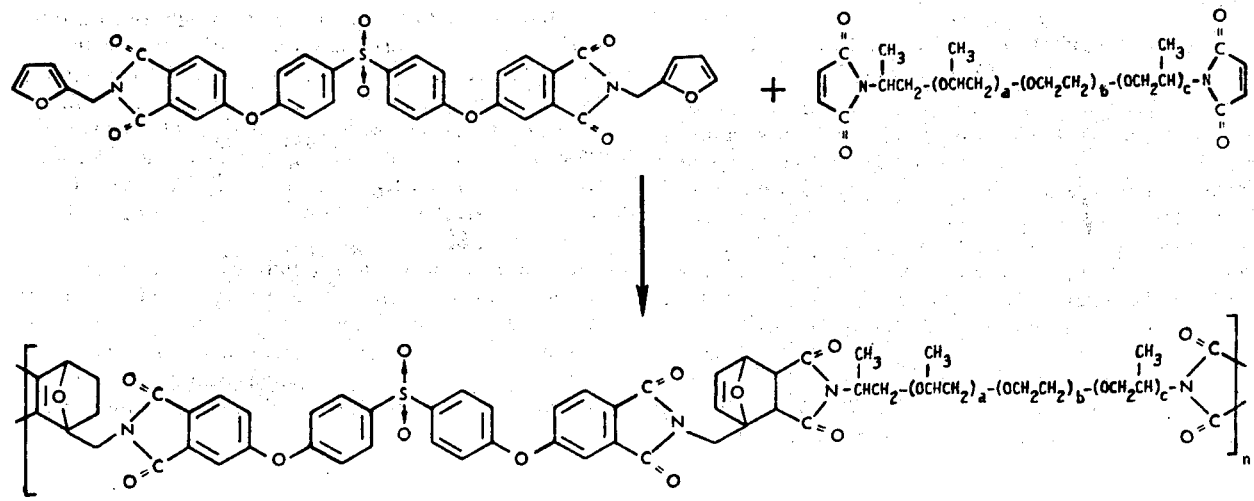

where $a$, $b$, and $c$ have been set forth previously, and $n$ is an integer of from approximately 5 to 50.

The resulting alicyclic endooxy linked polymer may be applied to a surface for a coating or applied to a seam as a sealant material. After the application, the alicyclic endooxy linkage is aromatized by heating at temperatures ranging from approximately 150°C to approximately 240°C for a predetermined time according to the following reaction:

phenoxyphenyl)sulfone dianhydride and an equal amount of bis(maleimide) of 900 molecular weight "Jeffamine ED." Various types and amounts of fillers were added to the polyimide resin, and the paste-like material was troweled onto aluminum substrates with a spatula and heated to 175°C to cure. All of the resulting polyimide resins had excellent adhesion and strength. When molecular sieves were added as a filler, there appeared to be fewer voids in the resin.

TABLE I

FILLERS EMPLOYED IN POLYIMIDE PASTE PREPARED FROM BIS(FURFURYLIMIDE) OF BIS(3,4-DICARBOXYPHENYL) SULFONE DIANHYDRIDE AND BIS(MALEIMIDE) OF POLYALIPHATIC ETHER DIAMINE

| Total Filler in Polyimide Paste (% w/w) | Powdered* Resin (100 mesh) | Ratio of Fillers Employed | | | |
|---|---|---|---|---|---|
| | | Fumed Silica nondusting | Fumed Silica >45μ | Fumed Silica 0.014μ | Molecular Sieves 13× |
| 20 | 100 | | | | |
| 20 | 80 | 20 | | | |
| 20 | 80 | | 20 | | |
| 20 | 80 | | | 80 | 20 |
| 24 | | | | 80 | 20 |
| 26 | 80 | | | | 20 |
| 26 | 60 | 40 | | | |
| 26 | 60 | | 40 | | |
| 26 | 60 | | | 40 | |
| 29 | 50 | | | 37 | 13 |

*Powdered resin prepared from polyimide polymer of formulation 60% methylene dianiline; 10% diaminostilbene; 30% polyaliphatic ether diamine 1,000 to 1,400 mol. wt., and bis(3,4-dicarboxyphenoxyphenyl) sulfone dianhydride.

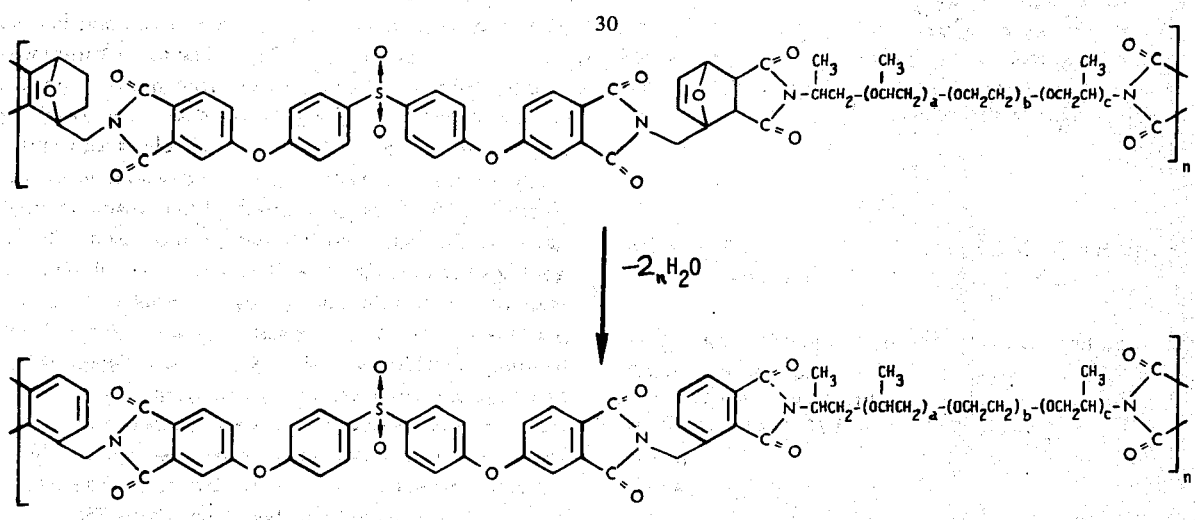

where $a$, $b$, $c$, and $n$ have been set forth previously.

These resins may be prepared for sealant use by the incorporation of inert powdered fillers in amounts ranging from 20 to 40 percent by weight of the total resin content. Inclusion of fillers in the resin will change the viscous resin to a paste or caulk consistency ideally suited for fabrication of fillant and faying sealant joints or for fabrication of molded seal and sealant products. Filler material may be selected from substantially any powdered material which is inert to the polyimide resin. Specific examples of suitable filler material are diatomaceous earth, calcium oxide, silicone dioxide, titanium oxide, or aluminum oxide. Particle sizes for the filler powder may range from extremely fine to moderately coarse. Preferably, the particle size will range between 0.005 microns to 325 mesh. Particle sizes in this range provide an excellent thickening agent for the viscous resin.

Table I shows the filler loading for a polyimide paste prepared from bis(furfurylimide) of bis(3,4-dicarboxy- It may be seen from the above table that the polyimide resin prepared according to the present invention may be filled with from 20 percent of another polyimide resin to 20 percent of a filler comprising 50 percent of the other polyimide resin, 37 percent of a submicron fumed silica, and 13 percent of molecular sieve 13×. In all cases excellent adhesion and strength was obtained.

To show suitability of the cured polyimide resin for use as a sealant in hydrocarbon fuels, viz. JP-7, specimens of neat or unfilled polyimide film and filled polyimide film and filled paste were prepared from bis(furfurylimide) of bis(3,4-dicarboxyphenoxyphenyl)sulfone dianhydride and bis(maleimide) of 900 molecular weight "Jeffamine ED." Fillers which were used comprised 12.5 percent of "Cab-O-Sil M5," a fumed silica from the Cabot Corporation, and 4.2 percent by weight of molecular sieve 13×. Three specimens were applied to aluminum sheeting and were isothermally aged in order to determine if there was any failure in the adhesion to the aluminum. The results of the aging are found in the following Table II.

TABLE II

ISOTHERMAL AGING RESULTS OF POLYIMIDE SEALANTS

| Specimen | Exposure Time (Hrs) | Adhesion After Aging | Aged in JP-7 at 450°F Weight Retention (%) |
|---|---|---|---|
| Unfilled film | 300 | a | 96 |
| Filled film | 300 | a | 95 |
| Filled Paste | 500 | Excellent | 94 | a — Not tested

Other films of reasonable uniformity were melt-cast and tested for tensile properties at room temperature. Neat or unfilled films of the resin described in the previous paragraph were processed in this manner to give reproducible tensile strength of 400 psi and an elongation of 150 percent. Retraction measurement indicated that greater than 95 percent of the elongation is recoverable. The neat or unfilled and the filled film samples were flexible at −40°C. All film samples were insoluble in dimethylformamide, indicating that a cross-linking reaction occurs in situ along with linear chain extension, thus eliminating the need for a special cross-linking cure system.

The following examples will illustrate methods employed in preparing the polyimide prepolymers and resins of the present invention, which may be subsequently mixed with an inert filler to form pastes or caulks.

EXAMPLE I

PREPARATION OF THE BIS(MALEIMIDE) OF 900 MOLECULAR WEIGHT JEFFAMINE

To a three-necked 500 ml round bottomed flask, fitted with a nitrogen inlet/outlet, thermometer, dropping funnel, and magnetic stirrer, was added 25.3g (0.26 mole) maleic anhydride and 75 ml dimethylformamide. In a separate beaker 100 ml dimethylformamide was thoroughly mixed with 120.0g (0.13 mole) Jeffamine ED 900. This solution was then placed in the dropping funnel and was slowly added to the stirred maleic anhydride solution. After complete addition of the Jeffamine/dimethylformamide solution, 2.3g (0.028 mole) sodium acetate and 28.6g (0.28 mole) acetic anhydride was added to the reaction mixture, and the mixture was heated at 50°C for at least three hours.

After reacting at 50°C for 3 hours the solution was cooled and the dimethylformamide was stripped off under vacuum with mild heating. When the dimethylformamide was completely removed, the remaining solution was dissolved in about 100 ml. chloroform, and this mixture was washed with distilled water three times to ensure complete removal of the sodium acetate and acetic acid. The resulting organic solution was then dried over night using 10g magnesium sulfate. After the solution was filtered to remove the magnesium sulfate, the chloroform was stripped off in a rotary evaporator under mild heating. The resulting product was a dark brown, viscous liquid.

EXAMPLE II

PREPARATION OF SEALANT FORMULATION

In a small aluminum cup was weighed out 1.400 g (0.002 mole) bis(3,4-dicarboxyphenoxyphenyl) sulfone dianhydride furfurylimide, 2.120g (0.002 mole) Jeffamine 900 bis(maleimide), 0.352g (8% by wt) Cab-O-Sil M5, and 0.528g (12% by wt) molecular sieve 13x. The materials were thoroughly mixed together to form a viscous paste. The paste was then troweled onto a metal substrate with a spatula in any desired form. The specimen was then placed in an oven and heated from room temperature to 175°C. The temperature was maintained at 175°C for at least 4 hours to ensure complete curing of the polymer. The resulting material was a hard, rubbery polymer with excellent strength and adhesion.

EXAMPLE III

FABRICATION OF A FILLET SEALANT

In a small aluminum cup was weighed out 0.70g (0.001 mole) bis(3,4-dicarboxyphenoxyphenyl)sulfone dianhydride furfurylimide and 1.06g (0.001 mole) Jeffamine ED 900 bis(maleimide). The materials were thoroughly mixed together to form a viscous liquid. The aluminum cup was placed in an oven and heated from room temperature to 175°C. The temperature was maintained at 175°C for at least four hours to ensure complete curing of the polymer melt. The resulting polymer was a rubbery solid with excellent adhesion.

Additionally, if improved thermal-oxidative or hydrocarbon fuel stability is required, the aromatic character of the polyimide should be increased. This is accomplished by preparing prepolymers of bis(maleimide) of a polyaliphatic ether diamine and bis(furfurylimide) of bis(3,4-dicarboxyphenoxyphenyl)sulfone dianhydride and reacting those two compounds to form a prepolymer which is subsequently reacted with a prepolymer formed from a bis(maleimide) of methylene dianiline and bis(furfurylimide) of bis(3,4-dicarboxyphenoxyphenyl) sulfone dianhydride. These prepolymers were mixed together in different ratios and reacted together to form films which approximate a theoretical block polymer configuration.

EXAMPLE IV

PREPARATION OF BIS(MALEIMIDE) POLYALIPHATIC ETHER DIAMINES AND BIS(FURFURYLIMIDE) OF BIS(3,4-DICARBOXYPHENOXYPHENYL)SULFONE DIANHYDRIDE POLYMER

Exactly 2.800g (4 mmole) of bis(furfurylimide) of bis(3,4-dicarboxyphenoxyphenyl)sulfone dianhydride and 4.240g (4 mmole) of bis(maleimide) of 900 molecular weight Jeffamine ED were mixed together in an aluminum cup and heated in an oven at 110°C for 2 to 3 hours. The resulting product was a brown, very viscous gum which was soluble in dimethyl formamide and acetone.

EXAMPLE V

PREPARATION OF BIS(MALEIMIDE) OF METHYLENE DIANILINE AND BIS(FURFURYLIMIDE) OF BIS(3,4-DICARBOXYPHENOXYPHENYL) SULFONE DIANHYDRIDE PREPOLYMER

Exactly 2.800g (4 mmole) of bis(furfurylimide) of bis(3,4-dicarboxyphenoxyphenyl)sulfone dianhydride and 1.432g (4 mmole) of bis(maleimide) of methylene dianiline were added to about 20 ml of dimethylformamide. The compounds completely dissolved and the solution was heated to 80°C for 2 to 3 hours. A dimethylformamide was stripped off and the prepolymer was dried under vacuum at 100°C for 3 hours. Resulting product was a bright yellow polymer of low molecular weight.

EXAMPLE VI

PREPARATION OF NEAT BLOCK POLYMERS

Three specimens of bis(maleimide) of 900 molecular weight Jeffamine ED, and bis(furfurylimide) of bis(3,4-dicarboxyphenoxyphenyl)sulfone dianhydride prepolymer weighing 2.81g (1.6 mmole), 2.46g (1.4 mmole), and 2.11g (1.2 mmole), respectively, were mixed together with the bis(maleimide) of methylene dianiline and the bis(furfurylimide) of bis(3,4-dicarboxyphenoxyphenyl)sulfone dianhydride prepolymer weighing 0.423g (0.4 mmole), 0.635g (0.6 mmole), and 0.847 g (0.8 mmole), respectively. The very viscous material was then placed on a sheet of aluminum and heated in an oven to about 120°C for 1 to 2 hours. The heating was then increased until the temperature was 180°C and was held at that temperature for three hours. Properties of the unfilled block polymers are shown in the following Table III:

TABLE III

| Mole Ratio of Prepolymer Used | | Qualitative[a] Adhesion | Tensile Properties[b,c] | |
|---|---|---|---|---|
| (1) | (2) | | Strength (psi) | Elongation (%) |
| 80 | 20 | Good | 770 | 220 |
| 70 | 30 | Good | 620 | 120 |

[a] Determined by attempts to remove the thin cast films from aluminum plates by hand pulls.
[b] Average of three breaks determined on thick (ca. 5–10 mil thick) films employing a 0.2 inch/min. crosshead speed.
[c] Retraction measurements show that recoverable elongation is ≥ 60% of values stated in Table.

We claim:

1. A method for making a compliant polyimide comprising polymerizing:
an aromatic bis furfurylimide prepared by reacting (A) one equivalent of an aromatic dianhydride with (B) one molecular weight of furfurylamine with an aliphatic ether bis(maleimide) prepared by reacting (C) one equivalent weight of functionally terminated aliphatic ether selected from the group consisting of diisocyanate terminated aliphatic ethers and diamine terminated ethers with (D) one molecular weight of maleic anhydride in a temperature range of from 20°C to 60°C; and curing said imide polymer by heating in a temperature range of from 150°C to approximately 240°C.

2. A method according to claim 1 wherein: said dianhydride has the structure:

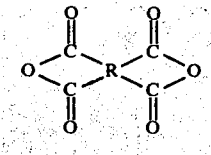

wherein R is a tetrafunctional radical selected from the group consisting of

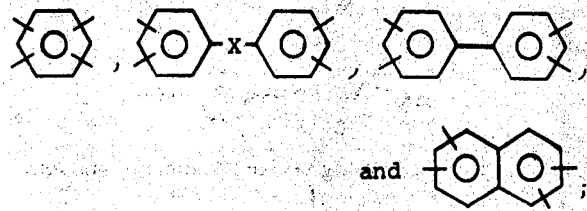

and

wherein X is selected from the group consisting of —O—, —S—, —SO$_2$—, —CO—, —CH$_2$—, —C$_2$H$_4$—, —C$_3$H$_6$—, and

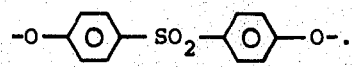

3. A method according to claim 1 wherein: said functionally terminated aliphatic ethers have the structure:

Z(OA)$_y$Z wherein Z is a monovalent radical selected from the group consisting of —N=C=O and —NH$_2$; A is an aliphatic radical consisting of alkylene groups having one to six carbon atoms, alkylidene groups having one to six carbon atoms, haloalkylene groups having one to six carbon atoms; and wherein y is an integer from 4 to 50 to yield a difunctional compound having a molecular weight of at least 400.

4. A method for making a compliant polyimide sealant comprising polymerizing:
an aromatic bis furfurylimide prepared by reacting (A) one equivalent of an aromatic dianhydride with (B) one molecular weight of furfurylamine with an aliphatic ether bis(maleimide) prepared by reacting (C) one equivalent weight of functionally terminated aliphatic ether selected from the group consisting of diisocyanate terminated aliphatic ethers and diamine terminated ethers with (D) one molecular weight of maleic anhydride in a temperature range of from 20°C to 60°C, said bis (furfurylimide) and bis(maleimide) homogeneously admixed with a solid inert filler; and curing said filled imide polymer by heating in a temperature range of from 150°C to approximately 240°C.

5. A method according to claim 4 wherein: said dianhydride has the structure:

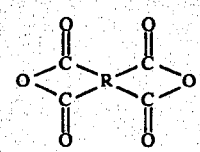

wherein R is a tetrafunctional radical selected from the group consisting of

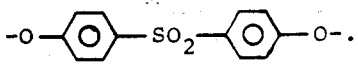, and

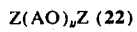 ;

wherein X is selected from the group consisting of —O—, —S—, —SO$_2$—, —CO—, —CH$_2$—, —C$_2$H$_4$—, —C$_3$H$_6$—, and -o-⟨O⟩-SO$_2$-⟨O⟩-o-.

6. A method according to claim 4 wherein: said functionally terminated aliphatic ethers have the structure:

Z(AO)$_y$Z  (22)

wherein Z is a monovalent radical selected from the group consisting of —N=C=O and —NH$_2$; A is an aliphatic radical consisting of alkylene groups having one to six carbon atoms, haloalkylene groups having one to six carbon atoms, and oxyalkylene groups having one to six carbon atoms; and wherein y is an integer from 4 to 50 to yield a difunctional compound having a molecular weight of at least 400.

7. A method according to claim 4 wherein:
said solid inert filler is selected from the group consisting of silicon dioxide, calcium oxide, titanium dioxide, molecular sieves, diatomaceous earth, and aluminum oxide.

* * * * *